Nov. 20, 1923

W. L. FLEISHER

APPARATUS FOR DESICCATION

Filed Oct. 27, 1922

1,474,626

INVENTOR
W. L. FLEISHER
BY
ATTORNEY

Patented Nov. 20, 1923.

1,474,626

UNITED STATES PATENT OFFICE.

WALTER L. FLEISHER, OF NEW YORK, N. Y., ASSIGNOR TO W. L. FLEISHER & CO. INC., OF NEW YORK, N. Y., A CORPORATION OF NEW YORK.

APPARATUS FOR DESICCATION.

Application filed October 27, 1922. Serial No. 597,433.

*To all whom it may concern:*

Be it known that I, WALTER L. FLEISHER, a citizen of the United States, and a resident of the borough of Manhattan, county of New York, city and State of New York, have invented a new and Improved Apparatus for Desiccation, of which the following is a full, clear, and exact description.

An object of my invention is to provide an apparatus which will facilitate the removal of the desiccated matter without undue circulation of the same in the desiccating chamber.

In this apparatus, as in my other application, Serial #441,930, I provide a main and secondary effluent, the secondary effluent being located in the lower part of the chamber so that gravity would aid the efficiency of the said secondary effluent, in this case, as a dust remover. The said secondary effluent is made so that it converges towards the end that is remote from the desiccating chamber, before it enters the effluent conduit leading to the dust collecting chamber.

The appended drawing illustrates diagrammatically the apparatus and in which—

Figure 1 is a cross-section on line 1—1 of the apparatus embodying my invention, and Figure 2 is a longitudinal section through the apparatus, on line 2—2, Figure 1.

In the said drawing, 1, is the desiccating chamber, which is preferably cylindrical in shape so as to aid the formation of a curvilinear current in said desiccating chamber by the desiccating agent such as air that may be forced thereinto through an inlet 2. As will be noted the air inlet is disposed to admit air tangentially to the cylindrical surface of the desiccating chamber and therefore, the desiccating agent forced therein by a fan, not shown in the drawing, will tend to travel along the curvilinear surface of the drum-shaped desiccating chamber.

The main effluent 3 is located in proximity of the inlet 2 so that the desiccating agent is forced to travel through the entire surface of the chamber before it can pass out. This arrangement of the main effluent 3 aids to induce a recirculation of the current within the desiccating chamber.

The secondary effluent 4 is preferably located in the lower part of the chamber and it converges away from the chamber so that the velocity of the outgoing effluent air increases as it approaches the gate 5, provided between the effluent 4 and the conduit 6 which leads to the dust collector conduit 7. The main effluent 3 also has a conduit 8 leading to the dust collector conduit 7.

The matter to be desiccated is introduced through nozzles 9 which are disposed along the curvilinear surface of the desiccating chamber between the two effluents.

The substance to be desiccated is fed to nozzles through a conduit 10 and it is atomized into the desiccating chamber 1, by means of a compressible fluid flowing through a conduit 11.

The desiccating current as it is circulated in the chamber tends to sweep the curvilinear wall of the desiccating chamber and thereby sweeps the matter that is desiccated and which clings to the wall into the converging opening 4 of the secondary effluent. Due to the fact that the velocity of the air entering the secondary effluent increases as is approaches the gate, the dried particles of the matter have no chance of leaking back into the desiccating chamber. The purpose of the gate 5 is to regulate the quantity of the effluent air which may pass through the secondary effluent and, in consequence it also controls, somewhat, the amount of air that is recirculated in the desiccating chamber.

I claim:

1. An apparatus of the class described comprising a chamber having an air inlet near the top thereof a main air outlet in proximity of the air inlet and below the same and a secondary outlet at the bottom of the chamber, conduits connecting the said outlets, means for admitting matter to be desiccated into the said chamber disposed between the air outlets, and a gate associated with the said secondary outlet said secondary outlet converging toward the gate.

2. An apparatus of the class described comprising a cylindrical chamber adapted to be disposed horizontally said chamber having an air inlet a main outlet and a secondary outlet all running substantially the entire length of the chamber said inlet being disposed near the upper part of said chamber, and said main outlet in close proximity of the inlet and below the same the secondary outlet being disposed at the lower part of the chamber, a conduit connecting the said outlets, means for admitting the matter to be desiccated into the chamber disposed along the chamber between the outlets, and a gate interposed between the secondary outlet and the conduit.

3. An apparatus of the class described comprising a cylindrical chamber adapted to be disposed horizontally said chamber having an air inlet a main outlet and a secondary outlet all running substantially through the entire length of the chamber said inlet being disposed near the upper part of the chamber and the main outlet in close proximity of the inlet and below the same said secondary outlet being disposed at the lower part of the chamber, a conduit connecting the said outlets, means for admitting matter to be desiccated disposed along the chamber between the outlets, and a gate for controlling the outflow from the secondary outlet to the conduit said secondary outlet converging towards said gate so as to increase the velocity of the outflow from the chamber through said secondary outlet to said gate.

WALTER L. FLEISHER.